United States Patent [19]

Semmler et al.

[11] Patent Number: 4,629,280

[45] Date of Patent: Dec. 16, 1986

[54] JOINT THREADS CARBON ON GRAPHITE ELECTRODE

[75] Inventors: Jürgen Semmler, Donauwörth; Günter Kraus, Ehekirchen, both of Fed. Rep. of Germany

[73] Assignee: Sigri GmbH, Meitingen, Fed. Rep. of Germany

[21] Appl. No.: 810,528

[22] Filed: Dec. 17, 1985

Related U.S. Application Data

[63] Continuation of Ser. No. 625,719, Jun. 28, 1984, abandoned.

[30] Foreign Application Priority Data

Jul. 8, 1983 [DE] Fed. Rep. of Germany ....... 3324692

[51] Int. Cl.<sup>4</sup> ............................................... H01R 4/00
[52] U.S. Cl. .................................. 339/263 E; 373/92; 403/DIG. 5
[58] Field of Search .................... 339/263 E; 403/296, 403/DIG. 5; 373/91, 92

[56] References Cited

U.S. PATENT DOCUMENTS 2,957,716 10/1960 Kaufmann et al. .................. 287/127
3,612,586 10/1971 Stieber et al. .......................... 373/92

FOREIGN PATENT DOCUMENTS 1029105  4/1958  Fed. Rep. of Germany .
1061458 12/1959  Fed. Rep. of Germany .
1272472  2/1969  Fed. Rep. of Germany .
2226230 11/1979  Fed. Rep. of Germany .
1409334 10/1975  United Kingdom .

Primary Examiner—John McQuade
Attorney, Agent, or Firm—Herbert L. Lerner; Laurence A. Greenberg

[57] ABSTRACT

Connections between sections having thread sockets at the end face of carbon or graphite electrode by a double-conical threaded nipple screwed into the sockets in which the cone halves of the nipple are different in height.

1 Claim, 1 Drawing Figure

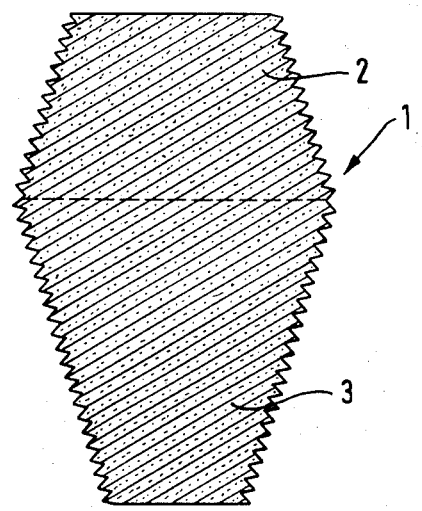

JOINT THREADS CARBON ON GRAPHITE ELECTRODE

This application is a continuation of application Ser. No. 625,719, filed June 28, 1984, now abandoned.

BACKGROUND OF THE INVENTION

1. Field of the Invention

The invention relates to a connection between the sections of a carbon or graphite electrode which sections are each provided at the end face with a conical threaded socket. The connection is a double-conical threaded nipple screwed into the sockets.

2. Description of the Prior Art

The carbon and graphite electrodes used in the manufacture of electric-furnace steel, steel alloys, silicon and the like, called electrodes in the following, consist generally of several cylindrical parts or sections screwed to each other. The sections are provided at the end face with recesses or sockets, into which a screw thread is worked. Double-conical threaded nipples which likewise consist of carbon or graphite are screwed into the sockets in order to mechanically and electrically connect the adjoining electrode sections to each other.

In the operation of the electrode in arc furnaces, the joint between the electrode sections and the nipple is subjected to mechanical stresses which are produced primarily by temperature gradients at the joint. The mechanical stresses are obviously a minimum if the threaded nipple is inserted into both sockets to the same depth, i.e. if the thread clearance is nearly constant over the entire length of the thread. In case of an asymmetrical screw connection, the induced mechanical stress can trigger the breakage of the connection. Accordingly, numerous proposals for making a symmetrical nipple connection between the sections of an electrode have been suggested. According to German Published Prosecuted Application No. DE-AS 1 029 105, the nipple is screwed into the socket of the first section up to the stop. Then the nipple is turned back to a slight extent but sufficient that after screwing-on the second electrode section, the threads of both nipple halves make contact with the thread flanks of the counterthread only when the flanks face the connecting surface. Since, under rough operating conditions, the amount of reverse screwing cannot always be observed with sufficient reliability, it has been proposed, for making a symmetrical nipple connection, to limit the screwing-in depth of the nipple into the socket of the first section by a stop perhaps in the form of a deformable spacer (for instance, German Pat. No. 10 61 458, German Pat. No. 1 272 472). The spacers are inserted here into recesses of the socket bottom. However, a symmetrical seat of the nipple is not obtained with these measures, except possibly an occasional accidental occurrence, because a larger tolerance must be permitted for the machining of the threads to assure that the screw connection is possible. The symmetry plane of the double-cone nipple is therefore generally located above or below the contact surface of the electrode sections, with the result that the clearance in the two halves of the connection will be different. Since the contact resistance increases with the clearance and the Joule heat produced is proportional to the contact resistance, the nipple halves are heated up differently and large, different mechanical stresses are produced in the connection halves.

It is known to provide the symmetry plane with special markers, with the aid of which the symmetry plane can be brought into coincidence with the end faces of the electrode sections, and to fix the nipple in this position (German Published Prosecuted Application No. DE-AS 22 26 230). However, making this symmetrical connection is relatively cumbersome.

SUMMARY OF THE INVENTION

An object of the invention is to provide a connection between the sections of an electrode, the two halves of which are stressed thermally to the same extent, and to provide connection means which can be manufactured simply.

With the foregoing and other objects in view, there is provided in accordance with the invention connections between section of a carbon or graphite electrode, each said section having at its end face a conical threaded socket, with a double-conical threaded nipple with the cone halves of the threaded nipple different in height, and with the shorter part of the nipple first screwed into one socket of one section of the electrode and the longer part of the nipple then screwed into the other socket of the other section of the electrode to provide an area of contact surface based on physical contact between the threads of the longer part of the nipple and the socket in the half of the screw connection containing the longer part of the nipple which area is about equal to the area of contact between the threads of the shorter part of the nipple and the socket into which it is screwed.

Other features which are considered as characteristic for the invention are set forth in the appended claims.

Although the invention is illustrated and described herein as embodied in a connection between the sections of a carbon or graphite electrode, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates a double-conical threaded nipple in section for connecting sections of a carbon or graphite electrode. The cone halves of the nipple are different in height.

DETAILED DESCRIPTION OF THE INVENTION

The difficulties discussed above with a connection of the type mentioned at the outset are overcome by employing a double-conical threaded nipple, the cone halves of which are different in height. Preferably, the ratio of the height of the shorter cone half to the longer cone half of the double-conical threaded nipple is 1/1.05 to 3.

The invention is based on the insight that in the heating-up of the connection halves which entails different temperature conditions, a frequent cause of the failure of the connection, can be prevented by matching the resistances of both connection halves without the requirement of "symmetrizing" the connection for this purpose. The contact over a larger width of the engaged (supporting) thread flank or over both thread flanks of the first electrode section and the shorter nipple half, which is screwed-in first and makes a low clearance contact is compensated by the engagement of a longer portion of the thread of the second electrode section and the second, longer nipple half.

The assembly methods described in the following paragraphs designated 1 and 2 are prior art methods for connecting two electrode sections with one nipple. If there are two electrode sections both having threaded sockets at both end faces and if there is a threaded symmetrically tapered nipple one half of which is inserted and screwed into the socket of one electrode section and the other electrode section is screwed onto the second half of the threaded nipple, there are two possibilities which are known to any person skilled in the art.

1. The first half of the nipple is screwed into the socket of the first electrode section with a smaller torque and the second electrode is screwed onto the second half of the nipple with the full torque. Result—the engagement of the threads is less complete in the first half of the connection than in the second half.

2. The first half of the nipple is screwed into the socket of the first electrode section with the full torque and the second electrode is screwed onto the second half of the nipple with a smaller torque. Result the engagement of the threads is less complete in the second half of the connection than in the first half.

The differences are caused by the necessary clearance of the threads and the unnecessary but unavoidable tolerances. This problem is specific to screw-couplings with tapered nipple and does not materialize with cylinder-shaped nipples, because the diameter of such a nipple is constant over its whole length.

The different area of the contact surface in the two halves of the screw connection is the cause for the different contact resistances. In the part screwed-on last of the connection between the electrode sections, more Joule heat is accordingly produced in the operation of the electrode than in the part screwed together first. According to the invention, this effect is prevented by the use of a threaded nipple, the two halves of which are of different length. In the first case where a nipple half is screwed into the first electrode socket with a small torque, the height or length of the second nipple half is longer here, advantageously by 5 to 50%, depending on the type of thread, and preferably by 10 to 30%. In the second case where a nipple half is screwed into the first electrode socket with a full torque, i.e. tightly, the length of the second nipple half is longer than the first nipple half by 50 to 300%, preferably 50 to 100%. The nipple halves screwed-in last in both cases have the greater length. For joining electrode sections with a diameter of 500 to 600 mm which are screwed together in accordance with the first type screw connection, a double-cone nipple, for example, in which the halves are 355.6 and 457.2 mm long are satisfactory.

The differences between the heights of the nipple halves are determined by the slope of the cone, the type of thread, the type of the carbon or graphite material (because the deformation of the threads varies with the grade of the material) and the torque. By measuring the contact resistance in each half of the joint the best proportion of length can be determined easily.

The double-conical threaded nipple in accordance with the invention is shown schematically in FIG. 1. The threaded nipple 1 consists of the short cone half 2 and the long cone half 3.

There is claimed:

1. Joint between sections of a carbon or graphite electrode, each said section having at its end face a tapered threaded socket with a double-conical threaded nipple with one cone half of the two cone halves of the threaded nipple shorter in height than the other cone half in the proportion of the heights of the shorter cone half to the longer cone half of 1:1.05 to 1:3 with the cone half having the smaller height being screwed firstly and the cone half having the greater height being screwed secondly into the sockets with the length of threaded engagement between the cone half of greater height and its respective socket greater than the length of threaded engagement between the cone half of smaller height and its respective socket providing contact areas about equal for both halves of the joint.

* * * * *